United States Patent
Gwidt et al.

(10) Patent No.: US 12,140,098 B1
(45) Date of Patent: Nov. 12, 2024

(54) SYSTEMS AND METHODS FOR SERVICE REGENERATION OF A PARTICULATE FILTER

(71) Applicant: GM Global Technology Operations LLC, Detroit, MI (US)

(72) Inventors: J. Michael Gwidt, Brighton, MI (US); Matthew Pruski, Brighton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 18/470,895

(22) Filed: Sep. 20, 2023

(51) Int. Cl.
- F02D 41/02 (2006.01)
- F01N 3/023 (2006.01)
- F02P 5/15 (2006.01)
- F16H 61/14 (2006.01)

(52) U.S. Cl.
CPC ........... *F02D 41/029* (2013.01); *F01N 3/023* (2013.01); *F02P 5/1504* (2013.01); *F02D 2200/0802* (2013.01); *F02D 2200/502* (2013.01); *F16H 61/143* (2013.01); *F16H 2061/145* (2013.01)

(58) Field of Classification Search
CPC ........... F16D 41/029; F16D 2200/0802; F16D 2200/502; F01N 3/023; F02P 5/1504; F16H 61/143; F16H 2061/145
See application file for complete search history.

(56) References Cited

U.S. PATENT DOCUMENTS

| | | | | |
|---|---|---|---|---|
| 2006/0266017 A1* | 11/2006 | Kresse | ..................... | F01N 3/023 60/277 |
| 2007/0251220 A1* | 11/2007 | Dawson | ................ | F01N 3/0238 60/280 |
| 2008/0053074 A1* | 3/2008 | Verkiel | ................. | B60W 10/02 60/297 |
| 2009/0019838 A1* | 1/2009 | Marlett | ................. | F02D 41/083 60/287 |
| 2014/0008140 A1* | 1/2014 | Yoshida | ................ | F02D 41/029 180/309 |
| 2019/0390620 A1* | 12/2019 | Dudar | ..................... | G07C 5/085 |

* cited by examiner

*Primary Examiner* — Lori Wu
(74) *Attorney, Agent, or Firm* — Honigman LLP; Matthew H. Szalach; Jonathan P. O'Brien

(57) ABSTRACT

A system comprises an engine, a torque converter connected to the engine, a transmission connected to the torque converter via an input shaft, a particulate filter connected to the engine, an engine control module connected to the engine, the transmission, and the particulate filter, the engine control module being configured to perform service regeneration operations to lock the input shaft to the transmission and elevate the engine speed to retard the spark in the engine and increase the temperature in the particulate filter.

20 Claims, 4 Drawing Sheets

SYSTEMS AND METHODS FOR SERVICE REGENERATION OF A PARTICULATE FILTER

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to engine systems and methods and to the exhaust systems thereof, and more particularly relates to engine systems and methods that employ a transmission system lock for service regeneration of a particulate filter (PF) due to soot loading.

PFs routinely need service regeneration due to soot loading. One method for service regeneration of a PF is to place a vehicle into park or neutral, elevate the engine speed, and retard the spark in the engine to achieve a temperature of the PF above a pre-determined temperature to combust and remove the soot. Such a method can be very time consuming. Accordingly, it is desirable to provide more efficient and effective systems and methods for service regeneration of PFs.

SUMMARY

One aspect of the disclosure provides a system for a vehicle comprising an engine, a torque converter connected to the engine, a transmission connected to the torque converter via an input shaft, a particulate filter connected to the engine, an engine control module connected to the engine, the transmission, and the particulate filter, the engine control module being configured to perform service regeneration operations comprising determining whether the particulate filter is above a predetermined service regeneration limit, determining whether the transmission is in park or neutral, and if the particulate filter is above a predetermined service regeneration limit and the transmission is in park or neutral, performing service regeneration operations including locking the input shaft to the transmission and elevating the engine speed to retard the spark in the engine and increase the temperature in the particulate filter.

Implementations of the disclosure may include one or more of the following optional features. In some implementations, the engine control module is configured to increase the temperature in the particulate filter to a temperature sufficient to combust soot in the particulate filter. The engine control module may be configured to increase the temperature in the particulate filter to above 600° C.

If the engine control module determines that the particulate filter is below a predetermined service regeneration limit, then the engine control module may be configured to not perform service regeneration operations.

If the engine control module determines that the transmission is in drive or reverse, then the engine control module may be configured to not perform service regeneration operations.

The engine may be a gasoline engine.

The service regeneration operations may result in the torque converter slip being equal to the engine speed.

Another aspect of the disclosure provides a system comprising an engine, a torque converter connected to the engine, a transmission connected to the torque converter via an input shaft, a particulate filter connected to the engine, an engine control module connected to the engine, the transmission, and the particulate filter, the engine control module being configured to perform service regeneration operations to lock the input shaft to the transmission and elevate the engine speed to retard the spark in the engine and increase the temperature in the particulate filter.

Implementations of the disclosure may include one or more of the following optional features. In some implementations, the engine control module is configured to increase the temperature in the particulate filter to a temperature sufficient to combust soot in the particulate filter. The engine control module may be configured to increase the temperature in the particulate filter to above 600° C.

If the engine control module determines that the particulate filter is below a predetermined service regeneration limit, then the engine control module may be configured to not perform service regeneration operations.

If the engine control module determines that the transmission is in drive or reverse, then the engine control module may be configured to not perform service regeneration operations.

The engine may be a gasoline engine.

The service regeneration operations may result in the torque converter slip being equal to the engine speed.

Another aspect of the disclosure provides a system comprising an engine control module (ECM) configured to perform service regeneration operations comprising determining whether a particulate filter is above a predetermined service regeneration limit, determining whether a transmission is in park or neutral, and if the particulate filter is above a predetermined service regeneration limit and the transmission is in park or neutral, locking an input shaft to the transmission and elevating the speed of an engine to retard the spark in the engine and increase the temperature in the particulate filter.

Implementations of the disclosure may include one or more of the following optional features. In some implementations, the engine control module is configured to increase the temperature in the particulate filter to a temperature sufficient to combust soot in the particulate filter. The engine control module may be configured to increase the temperature in the particulate filter to above 600° C.

If the engine control module determines that the particulate filter is below a predetermined service regeneration limit, then the engine control module may be configured to not perform service regeneration operations.

If the engine control module determines that the transmission is in drive or reverse, then the engine control module may be configured to not perform service regeneration operations.

The engine may be a gasoline engine.

The details of one or more implementations of the disclosure are set forth in the accompanying drawings and the description below. Other aspects, features, and advantages will be apparent from the description and drawings, and from the claims.

BRIEF DESCRIPTION OF THE DRAWINGS

The drawings described herein are for illustrative purposes only of selected configurations and are not intended to limit the scope of the present disclosure.

Corresponding reference numerals indicate corresponding parts throughout the drawings.

DETAILED DESCRIPTION

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

Figure 1:
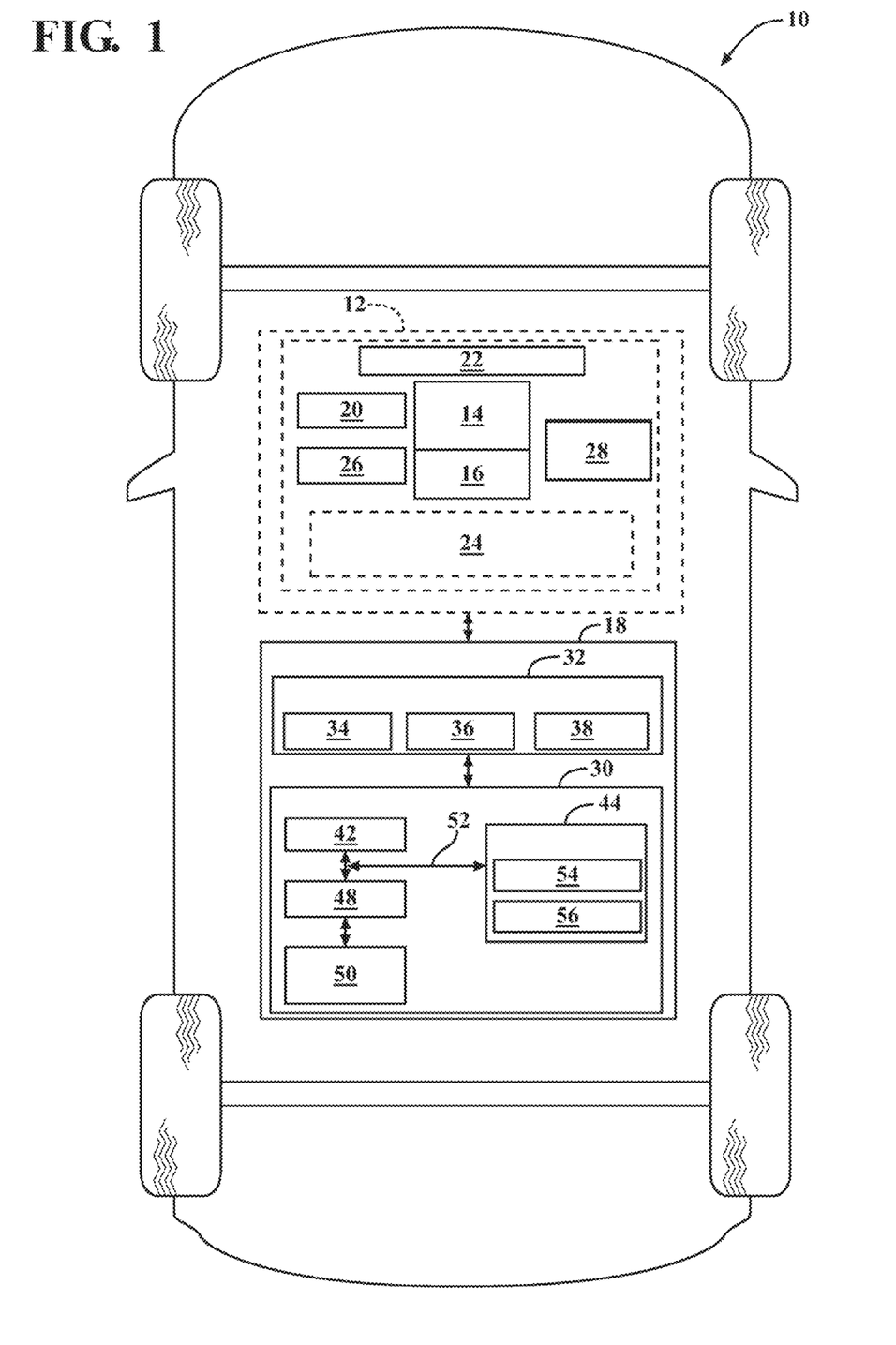
FIG. 1 is a functional diagram of a vehicle that includes a powertrain system with a transmission lock, in accordance with an exemplary configuration.

Referring to FIG. 1, illustrated is a vehicle 10, having a powertrain system 12 according to an exemplary configuration. The powertrain system 12 includes an engine 14 using internal combustion that is controlled to optimize fuel economy and emissions based on a requested load. The requested load may be based on a driver request or on an autonomous input for torque and/or speed. To deliver the requested torque and/or speed, a transmission 16 is coupled with the engine 14. The transmission 16 may operate to provide forward operation of the vehicle 10, reverse operation of the vehicle 10, and a number of speed ratios for the output from the engine 14 where power may be transferred to wheels of the vehicle 10. The transmission 16 may also be selectively placed in a park state and in a neutral state where power is not delivered to the wheels of the vehicle 10.

In certain configurations, the vehicle 10 comprises an automobile. As will be appreciated, the vehicle 10 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain configurations. The vehicle 10 may also comprise a truck, a watercraft, an aircraft, and/or one or more other types of vehicles. In addition, in various configurations, it will also be appreciated that the vehicle 10 may comprise any number of other types of mobile platforms with an engine system such as the powertrain system 12.

In the depicted configuration, the vehicle 10 includes a body that substantially encloses other components of the vehicle 10. The vehicle 10 also includes a plurality of axles and wheels. The wheels are each rotationally coupled to one or more of the axles near a respective corner of the body to facilitate movement of the vehicle 10. In one configuration, the vehicle 10 includes four wheels, although this may vary in other configurations (for example for trucks and certain other vehicles).

The vehicle 10 further includes a control system 18 associated with the powertrain system 12 and with other systems of the vehicle 10. The powertrain system 12 may drive the vehicle wheels to rotate in a forward direction or a reverse direction. The powertrain system 12 generally includes a number of components and subsystems including the engine 14, the transmission 16, an ignition system 20, an intake system 22, an exhaust system 24, a fuel system 26, and a valve system 28. In various configurations, the powertrain system 12 is a four-stroke internal combustion engine in which a piston in each cylinder completes an intake stroke, a compression stroke, a combustion stroke, and an exhaust stroke to drive the engine 14. Any number of cylinders may be included in the engine 14. The intake system 22 delivers air and controls the air's mass flow rate to the cylinders, such as via a throttle. The fuel system 26 delivers fuel to the cylinders and controls its timing and amount via a number of injectors. The valve system 28 includes a number of valves to control the flow of air/gases into and out of the cylinders. The valves may have variable timing. The ignition system 20 is operated to control the timing of, and initiate, combustion in the cylinders. The exhaust system 24 conveys combustion gases from the engine 14 to the atmosphere and may include after-treatment devices.

In various configurations, the control system 18 provides instructions for controlling various aspects of the vehicle 10 including for controlling the powertrain system 12. The control system 18 comprises an engine control unit (ECU) for the engine 14 and selectively controls operation of the engine system 12 to achieve optimized fuel economy and minimized emissions while achieving desired torque and speed outputs. The control system 18 provides these functions in accordance with the steps of the method 400 described further below in connection with the FIG. 4.

With continued reference to FIG. 1, the control system 18 includes a controller 30 (also referred to as an engine control unit or engine control module) and a sensor array 32. The sensor array 32 includes sensors for measuring observable conditions, including of the powertrain system 12, and generates sensor data based thereon. As shown in FIG. 1, the sensor array 32 includes one or more engine sensors 34. The engine sensors 34 are attached to, disposed within, or otherwise disposed in proximity to the powertrain system 12 such that various temperatures, positions, speeds, and other observable parameters are measured. The sensor array 32 includes one or more exhaust system sensors 36. The exhaust system sensors 36 are attached to, disposed within, or otherwise disposed in proximity to the exhaust system 24 such that various temperatures, concentrations, and other observable parameters are measured. In one configuration, the sensor array 32 may also include one or more other sensors 38 monitoring, for example, operation of the engine 14 and/or other systems and devices of the vehicle 10. For example, the other sensors 38 may include one or more ignition sensors for detecting when the engine 14 is turned on and/or running, one or more torque request sensors, such as a throttle position sensor, for detecting load requests of the engine 14, and other sensors as desired.

The controller 30 is coupled with the sensor array 32 and provides instructions for controlling the powertrain system 12 and the exhaust system 24 via commands based on the sensor data. As shown in FIG. 1, the controller 30 comprises a computer system. In certain configurations, the controller 30 may also include the sensor array 32 and/or one or more other vehicle components. In addition, it will be appreciated that the controller 30 may differ from the configuration shown in FIG. 1. For example, the controller 30 may be coupled with or may otherwise utilize one or more remote computer systems and/or other control systems, for example, as part of one or more of the above-identified vehicle devices and systems.

With continued reference to FIG. 1, the computer system of the controller 30 includes a processor 42, a memory 44, an interface 48, a storage device 50, and a bus 52. The processor 42 performs the computation and control functions of the controller 30 and may comprise any type of processor or multiple processors, single integrated circuits such as a microprocessor, or any suitable number of integrated circuit devices and/or circuit boards working in cooperation to accomplish the functions of a processing unit. During operation, the processor 42 executes one or more programs 54 contained within the memory 44 and, as such, controls the general operation of the controller 30 and the computer system of the controller 30 in executing the processes described herein, such as the method 200 discussed further below in connection with FIG. 4.

The memory 44 may be any type of suitable memory. For example, the memory 44 may include various types of dynamic random access memory (DRAM) such as SDRAM, the various types of static RAM (SRAM), and the various types of non-volatile memory (PROM, EPROM, and flash). In certain examples, the memory 44 may be located on and/or co-located on the same computer chip as the processor 42. As shown in FIG. 1, the memory 44 stores the above-referenced programs 54 along with stored values 56 (e.g., including predetermined threshold values for controlling emissions).

The bus 52 serves to transmit programs, data, status and other information or signals between the various components of the computer system of the controller 30. The interface 48 allows communications with the computer system of the controller 30, such as from a system driver and/or another computer system and is implemented using any suitable method and apparatus. In one embodiment, the interface 48 obtains the various data from the sensor array 32, the powertrain system 12, the exhaust system 24, and/or one or more other components and/or systems of the vehicle 10. The interface 48 may include one or more network interfaces to communicate with other systems or components. The interface 48 may also include one or more network interfaces to communicate with technicians, and/or one or more storage interfaces to connect to storage apparatuses, such as the storage device 50.

The storage device 50 may be any suitable type of storage apparatus, including various different types of direct access storage and/or other memory devices. In one exemplary embodiment, the storage device 50 comprises a program product from which the memory 44 receives the programs 54 that execute one or more embodiments of one or more processes of the present disclosure, such as the steps of the method 200 discussed further below in connection with FIG. 4. In another exemplary embodiment, the program product may be directly stored in and/or otherwise accessed by the memory 44 and/or the storage device 50 and/or other memory devices.

The bus 52 may be any suitable physical or logical means of connecting computer systems and components. This includes, but is not limited to, direct hard-wired connections, fiber optics, infrared, and wireless bus technologies. During operation, the programs 54 are stored in the memory 44 and are executed by the processor 42.

It will be appreciated that while this exemplary configuration is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 42) to perform and execute the program. Such a program product may take a variety of forms, and the present disclosure applies equally regardless of the particular type of computer-readable signal bearing media used to carry out the distribution. Examples of signal bearing media include recordable media such as floppy disks, hard drives, memory cards and optical disks, and transmission media such as digital and analog communication links. It will be appreciated that cloud-based storage and/or other techniques may also be utilized in certain configurations. It will similarly be appreciated that the computer system of the controller 30 may also otherwise differ from the configuration shown in FIG. 1, for example, in that the computer system of the controller 30 may be coupled to or may otherwise utilize one or more remote computer systems and/or other control systems.

Figure 2:
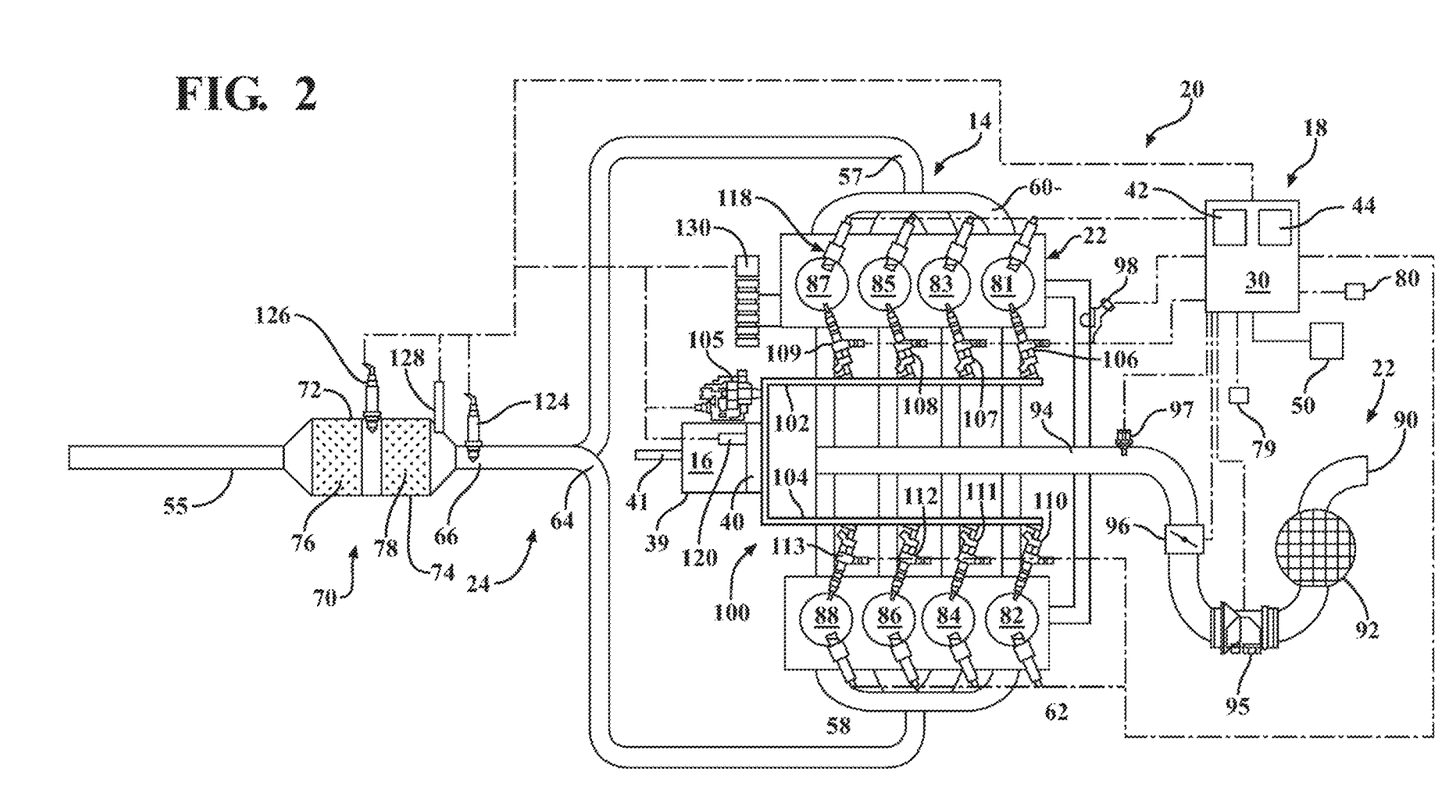
FIG. 2 is a schematic illustration of the powertrain system of the vehicle of FIG. 1 having the system with transmission lock, in accordance with various configurations.

Referring to FIG. 2, the powertrain system 12 includes the engine 14, which in the present configuration is an eight cylinder gasoline and air consuming internal combustion engine. In other configurations, the engine 14 may have any suitable number of cylinders. The engine 14 may be naturally aspirated as illustrated, or may include a turbocharger or supercharger to pump air into the engine for combustion purposes. The powertrain system 12 also includes the transmission 16, which is contained in a case 39 and is coupled with the engine 14 through a torque converter 40. The torque converter 40 may be a hydraulic torque converter with an impeller coupled with the engine 14 that fluidly drives a turbine coupled with the transmission 16. The turbine extracts energy from fluid pumped by the impeller to drive the transmission 16 and, ultimately, a driveshaft 41 coupled with one or more of the wheels of the vehicle 10.

The powertrain system 12 includes or is associated with the exhaust system 24 for conveying exhaust gases from the combustion chambers of the engine 14 to a tailpipe 55 for discharge to the atmosphere. A pair of pipe sections 57, 58 run from the engine 14, such as from its exhaust manifolds 60, 62, respectively, in a dual arrangement and through a junction 64 and a common pipe section 66 to an after-treatment system including an after-treatment system 70. In this configuration, the after-treatment system 70 includes a two-element arrangement with catalytic converters 72 and 74. The after-treatment system 70 may also include or be referred to as a particulate filter (PF). In other configurations, any suitable number of catalytic converters/elements may be included. The catalytic converters may be two-way or three-way type. The catalytic converters 72, 74, when configured as a two-way type, convert two components in the exhaust gas stream, including CO and HC, to other constituents. When the catalytic converters 72, 74 are configured as a three-way type, they convert three components in the gas stream to other elements or compounds including converting CO, HC and nitrogen oxides to innocuous elements or compounds. The catalytic converters 72, 74 may contain catalysts 76, 78 such as platinum, palladium or other materials. The rates at which the catalysts 76, 78 assist in the conversion of exhaust gases may vary relative to temperature. For example, at cold/cool temperatures the conversion rates may decline.

The powertrain system 12 is spark-ignition operated and, as such, includes an ignition system 20 having individual spark plugs 118 disposed in each of the cylinders 81-88. The ignition system 20 also includes a sensor 80 that may be operated by a key, an interface, or a remote transmitter. The sensor 80 may be coupled with the controller 30 to initiate operation of the vehicle 10.

The powertrain system 12 includes the intake system 22 with an air inlet 90, an air filter 92, and an intake manifold 94. The intake manifold 94 supplies air to the cylinders 81-88 of the engine 14 as controlled by intake valves (not illustrated). The exhaust system 24 conveys, as controlled by exhaust valves (not illustrated), combusted gases from the cylinders 81-88 to the atmosphere through the tailpipe 55. Disposed in the intake system 22 downstream from the air filter 92 and upstream from the intake manifold 94 are, in order, a mass air flow sensor 95, an intake throttle 96, and an intake manifold pressure sensor 97. The engine 14 is liquid cooled and includes a coolant temperature sensor 98 to provide data on the operating temperature of the engine. As used herein, upstream and downstream means the relative location of something in the flow of air/gases through the powertrain system 12 from the air inlet 90 to the tailpipe 55. For example, the air inlet 90 is upstream from the air filter 92 and the catalytic converter 74 is downstream from the junction 64.

The powertrain system 12 includes the fuel system 26 for supplying fuel to the cylinders 81-88. In the current configuration, the engine 14 is a gasoline-direct-injection engine with fuel rails 102, 104 supplying fuel from a fuel pump 105 to injectors 106-113. The powertrain system 12 also includes the control system 18 that generally includes the controller 30 coupled with the various actuators and sensors.

The controller 30 may receive various signals from the sensor array 32 and send control signals to various actuators for operation of the powertrain system 12 and its related systems. In the current configuration, the sensor array 32 includes the exhaust system sensors 36, which may include oxygen sensors 124 and 126, and an exhaust gas temperature sensor 128, such as upstream from the PF 70. The position of the exhaust gas temperature sensor 128 is selected to measure the temperature of the exhaust gas entering the catalytic converter 74. In other configurations, the exhaust gas temperature sensor 128 may be located downstream from the PF 70, or at another location in the exhaust system 24. In further configurations, two exhaust gas temperature sensors 128 may be included, with one upstream from the PF 70 and the other downstream from the PF 70. The oxygen sensors 124, 126 measure the oxygen content of the exhaust gases (i) leaving the engine 14 before the PF 70 and (ii) after the catalytic converter 74—before the catalytic converter 72. The oxygen sensors 124, 126 provide data to determine the amount of remaining CO in the gas stream at their locations in the exhaust system 24. The oxygen sensors 124, 126 may be exhaust/oxygen/wide range air-fuel (WRAF) sensors. The signals from the oxygen sensors 124, 126 vary according to changing oxygen levels in the exhaust and provide for determination of unburned oxygen in the exhaust indicative of CO content. The signals from the oxygen sensors 124, 126 may also be used to determine the fuel/air ratio and other parameters at which the engine 14 is operated by the controller 30.

The sensor array 32 includes the engine sensors 34, which include engine system sensors such as the mass air flow sensor 95, the intake manifold pressure sensor 97, the coolant temperature sensor 98, and an engine speed sensor 130. For example, the engine speed sensor 130 may sense crank position, providing input on the changing positions from which the speed of the engine 14, and particularly the angular speed of the crankshaft, may be determined. The engine speed sensor 130 may be configured to deliver a rotational speed signal for the speed of the engine 14 such as in revolutions-per-minute. The other sensors 38 may include any number of sensors of the vehicle 10 and include the sensor 80 for sensing an engine on request/state. The sensor 80 may be an ignition switch or another type of device for detecting the engine on request/state. The other sensors 38 include a transmission shift sensor 79. The transmission shift sensor may sense a position of an element of the transmission 16 or of its shift linkage to indicate whether the transmission 16 is in one of various states such as neutral, drive, low, reverse or park.

In the current configuration, the actuators may include a number of responsive devices associated with controlling operation of the powertrain system 12 and/or the vehicle 10. These actuators may include the intake throttle 96, the fuel injectors 106-113, the spark plugs 118, the fuel pump 105, one or more clutches 120 of the transmission 16. The actuators may include any number of additional devices such as variable valve actuators and others.

In the depicted configuration, the controller 30 includes the processor 42 and the memory 44 and is coupled with the storage device 50. The controller 30 commands an amount of fuel to be delivered to each cylinder 81-88 through the fuel system 100. A fuel-to-air ratio is the mass of fuel being delivered to the engine 14 over the mass of air being delivered to the engine 14. The amount of fuel commanded, generally correlates to the amount needed for stoichiometric operating conditions given the current operating state of the engine 14. Stoichiometric operation supplies the precise amount of air needed to result in complete burning of the fuel delivered to the cylinders 81-88 for converting all of the delivered fuel to carbon dioxide and water. Accordingly, a ratio of fuel-to-air that provides the right amount of air to completely burn the delivered fuel, is referred to as stoichiometric.

The powertrain system 12, the control system 18, the intake system 22, and the exhaust system 24 effect processing of multiple working fluids to accomplish desired results. For example, intake air and fuel are processed through the engine 14 with an air/fuel ratio delivered to the cylinders in closed-loop control, using inputs from the various sensors including those in the exhaust system 24 to make corrections for efficient operation and air/fuel consumption. In addition, the exhaust gas from the engine 14 is efficiently processed through the exhaust system 24 with control to quickly reach effective reaction rates in the PF 70.

Figure 3:
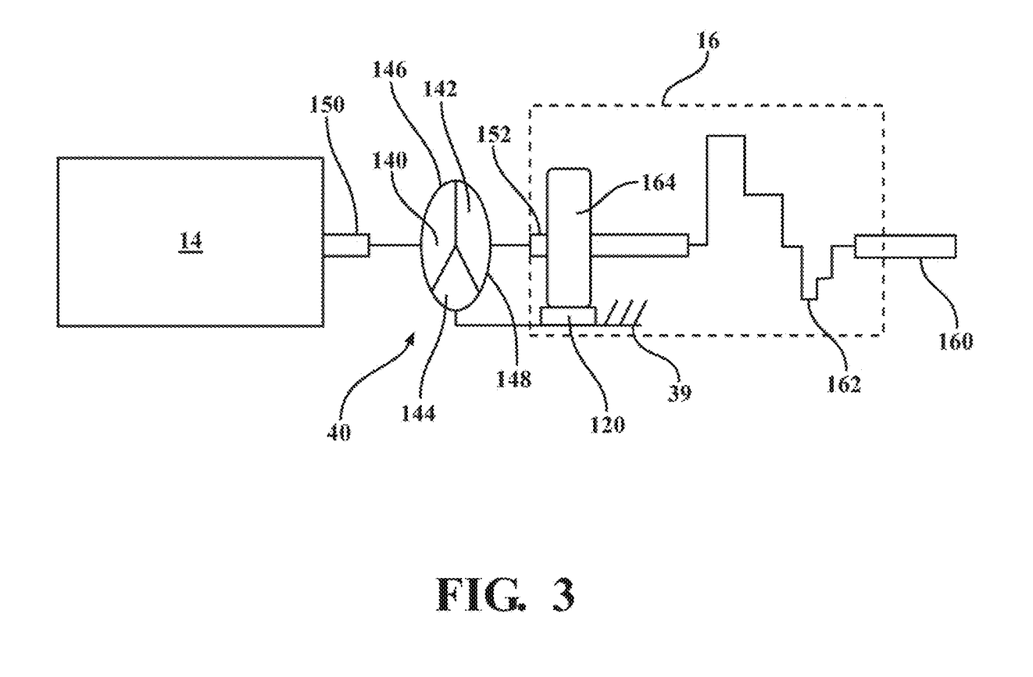
FIG. 3 is a schematic illustration of a torque converter area of the powertrain system of FIG. 2, in accordance with various configurations.

Referring to FIG. 3, the torque converter 40 is shown schematically. The torque converter 40) includes vanes sections including an impeller 140 and a turbine 142 and includes a stator 144. The impeller 140 and the turbine 142 each include a number of vanes and a respective housing section 146, 148 that mate together to contain fluid. The impeller 140 operates to pump fluid and the turbine 142 operates to extract energy from the pumped fluid. The stator 144 is disposed between the impeller 140 and the turbine 142 and redirects pumped fluid, thereby helping in torque multiplication.

The impeller 140 of the torque converter 40 is coupled an output element 150 of the engine 14 by one or more torque transfer elements including the housing section 146. The turbine 142 is coupled with an input shaft 152 of the transmission 16 through one or more torque transfer elements including the housing section 148. The stator 144 of the torque converter 40 is grounded, directly or indirectly, such as to the case 39 of the transmission 16. In some configurations, the ground may be through a clutch (not shown), that may operate to selectively allow or prevent rotation of the stator 144 for certain operating conditions. The stator 144 may also include a number of vanes that redirect fluid to harvest kinetic energy to allow the torque converter 40 to multiply torque.

The input shaft 152 of the transmission 16 is coupled with an output shaft 160 through a path that may include a variable series of torque transfer elements 162, that may include any combination of shafts, gears, clutches, plates, frames, or other members to provide various gear ratios. The clutch 120 is disposed between the input shaft 152 and the case 39 through a path that may be direct, or as in this configuration, through a torque transfer element 164, which may be a gear, plate, frame, or other element. For purposes of this disclosure, the clutch 120 is any device that is selectively operated to alternately lock and unlock the input shaft 152 and/or the turbine 142. For example, the clutch 120 may be a clutch, brake, arm, stop or other device to prevent the turbine 142 from rotating. The clutch 120 may be referred to generally as a lock. The clutch 120 is coupled with the controller 30 and may be activated to lock the input shaft 152 to the case 39 to selectively prevent rotation of the turbine 142. Preventing rotation of the turbine 142 with the impeller rotating and pumping fluid under operation of the engine 14 creates a load on the engine 14 causing it to work harder and to deliver more heat into the exhaust system 24.

Figure 4:
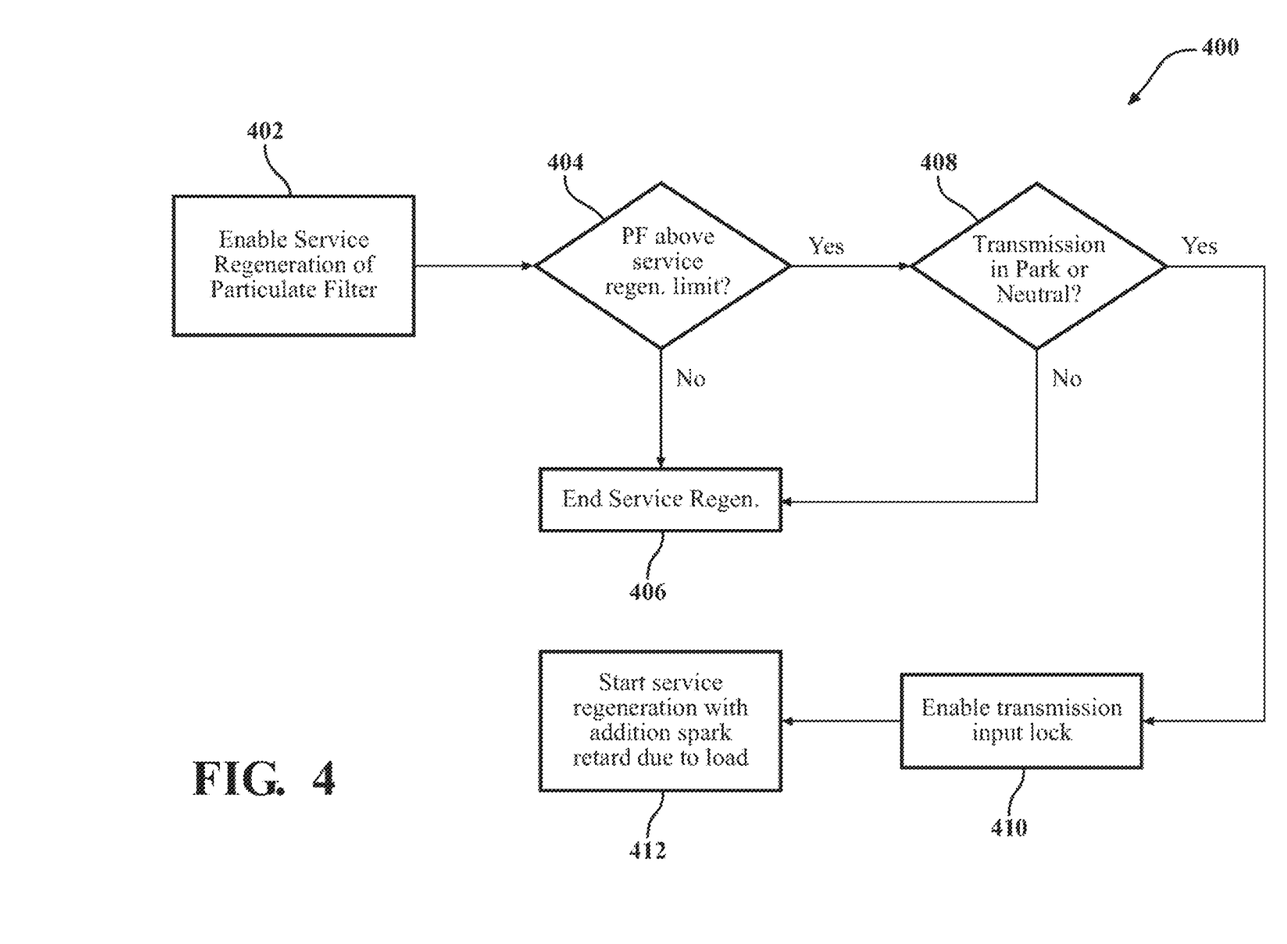
FIG. 4 is a flowchart of a process for implementing a service regeneration of a particulate filter of the system with transmission lock for the apparatus of FIGS. 1-3, in accordance with various configurations.

Referring to FIG. 4, a method 400 for service regeneration of the PF 70 is generally shown. The method 400 may be implemented via the controller 30 and its control of one or more components of the control system 18.

The method 400 includes a step 402 to provide for service regeneration of the PF 70. At step 404, the controller 30 determines whether the PF 70 is above the service regeneration limit. For example, the service regeneration limit may be a pre-determined limit based on time, miles driven, amount of soot build-up in the PF 70, or any combination of the foregoing. If the controller 30 determines, at step 404, that the PF 70 is not above the service regeneration limit, then the controller 30 terminates the service regeneration process 400 at step 406. If the controller 30 determines, at step 404, that the PF 70 is above the service regeneration limit, then the controller 30 proceeds with the service regeneration process 400 at step 408 to determine whether the transmission is in park or neutral.

If the controller 30 determines, at step 408, that the transmission is not in park or neutral, then the controller 30 terminates the service regeneration process 400 at step 406. If the controller 30 determines, at step 408, that the transmission is in park or neutral, then the controller 30 proceeds with the service regeneration process 400 at step 410 to enable the transmission input lock. As set forth above, the clutch 120 is coupled with the controller 30 and may be activated to lock the input shaft 152 to the case 39 to selectively prevent rotation of the turbine 142, such that the torque converter slip equals the engine speed. Preventing rotation of the turbine 142 with the impeller rotating and pumping fluid under operation of the engine 14 creates a load on the engine 14, retarding the spark, and causing it to work harder and to deliver more heat into the exhaust system 24.

At step 412, the controller starts service regeneration by elevating the speed of the engine 14 and retarding the spark, to create a load on the engine 14 and increase the temperature of the PF 70. At a certain temperature (e.g., approximately 600° C.), the soot build-up in the PF 70 begins to combust and is exhausted out of the tailpipe 55. After a pre-determined amount of time, or after a sufficient amount of soot build-up has been combusted and removed, the controller 30 terminates the service regeneration process 400.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises." "comprising." "including." and "having." are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below; the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICS (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks: magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A system for a vehicle comprising:
an engine;
a torque converter connected to the engine;
a transmission connected to the torque converter via an input shaft;
a particulate filter connected to the engine;
an engine control module connected to the engine, the transmission, and the particulate filter, the engine control module being configured to perform service regeneration operations comprising:
determining whether the particulate filter is above a predetermined service regeneration limit;
determining whether the transmission is in park or neutral; and
if the particulate filter is above a predetermined service regeneration limit and the transmission is in park or neutral, performing service regeneration operations including locking the input shaft to the transmission and elevating engine speed to retard a spark in the engine and increase a temperature in the particulate filter.

2. The system of claim 1, wherein the engine control module is configured to increase the temperature in the particulate filter to a temperature sufficient to combust soot in the particulate filter.

3. The system of claim 2, wherein the engine control module is configured to increase the temperature in the particulate filter to above 600° C.

4. The system of claim 1, wherein if the engine control module determines that the particulate filter is below a predetermined service regeneration limit, then the engine control module is configured to not perform service regeneration operations.

5. The system of claim 1, wherein if the engine control module determines that the transmission is in drive or reverse, then the engine control module is configured to not perform service regeneration operations.

6. The system of claim 1, wherein the engine is a gasoline engine.

7. The system of claim 1, wherein the service regeneration operations results in a torque converter slip being equal to the engine speed.

8. A system comprising:
an engine;
a torque converter connected to the engine;
a transmission connected to the torque converter via an input shaft;
a particulate filter connected to the engine; and
an engine control module connected to the engine, the transmission, and the particulate filter, the engine control module being configured to perform service regeneration operations to lock the input shaft to the transmission and elevate engine speed to retard a spark in the engine and increase a temperature in the particulate filter.

9. The system of claim 8, wherein the engine control module is configured to increase the temperature in the particulate filter to a temperature sufficient to combust soot in the particulate filter.

10. The system of claim 8, wherein the engine control module is configured to increase the temperature in the particulate filter to above 600° C.

11. The system of claim 8, wherein if the engine control module determines that the particulate filter is below a predetermined service regeneration limit, then the engine control module is configured to not perform service regeneration operations.

12. The system of claim 8, wherein if the engine control module determines that the transmission is in drive or reverse, then the engine control module is configured to not perform service regeneration operations.

13. The system of claim 8, wherein the engine is a gasoline engine.

14. The system of claim 8, wherein the service regeneration operations results in a torque converter slip being equal to the engine speed.

15. A system comprising:
an engine control module (ECM) configured to perform service regeneration operations comprising:
determining whether a particulate filter is above a predetermined service regeneration limit;
determining whether a transmission is in park or neutral; and
if the particulate filter is above a predetermined service regeneration limit and the transmission is in park or neutral, locking an input shaft to the transmission and elevating speed of an engine to retard a spark in the engine and increase a temperature in the particulate filter.

16. The system of claim 15, wherein the engine control module is configured to increase the temperature in the particulate filter to a temperature sufficient to combust soot in the particulate filter.

17. The system of claim 16, wherein the engine control module is configured to increase the temperature in the particulate filter to above 600° C.

18. The system of claim 15, wherein if the engine control module determines that the particulate filter is below a predetermined service regeneration limit, then the engine control module is configured to not perform service regeneration operations.

19. The system of claim 15, wherein if the engine control module determines that the transmission is in drive or reverse, then the engine control module is configured to not perform service regeneration operations.

20. The system of claim 15, wherein the engine is a gasoline engine.

* * * * *